US005872745A

United States Patent [19]

[11] Patent Number: 5,872,745

[45] Date of Patent: Feb. 16, 1999

Murakami

[54] TIME MEASURING METHOD AND TIME MEASURING SYSTEM WHICH ENABLE TO DISCRIMINATE WHETHER OR NOT THE MEASUREMENT RESULT IS WITHIN THE REQUIRED MEASUREMENT

[75] Inventor: Hirokuni Murakami, Kanagawa, Japan

[73] Assignee: NEC Corporation, Tokyo, Japan

[21] Appl. No.: 100,816

[22] Filed: Jun. 19, 1998

[30] Foreign Application Priority Data

Jun. 20, 1997 [JP] Japan .................................... 9-164080

[51] Int. Cl.[6] .............................. G04F 8/00; G04F 10/00; G06F 15/20

[52] U.S. Cl. ............................................ 368/113; 364/569

[58] Field of Search .................................... 368/113–120; 364/569; 377/20

[56] References Cited

U.S. PATENT DOCUMENTS 4,908,784 3/1990 Box et al. ............................... 364/569
5,200,933 4/1993 Thornton et al. ....................... 368/113
5,311,486 5/1994 Alton et al. ............................... 368/10
5,570,326 10/1996 Trystram ................................ 368/113

*Primary Examiner*—Vit Miska
*Attorney, Agent, or Firm*—Scully, Scott, Murphy & Presser

[57] ABSTRACT

In a time measuring system having a high-speed counter section (1) for counting up a counter value in response to a clock signal between supplies of a measurement start signal and a measurement stop signal to produce a counter output signal representative of the counter value, a signal producing section (4) is supplied with a measurement able/disable switching signal and with an original stop signal and produces the measurement start signal and the measurement stop signal. An adding section (2) executes an adding operation as regards the counter value by the use of the clock signal and the counter output signal to produce a sum total of the counter value. Responsive to the sum total, a data producing section (3) produces a resolution datum by the use of the counter output signal. In order to produce the measurement start signal and the measurement stop signal, the signal producing section uses the resolution datum, the sum total, and the clock signal. The measurement start signal and the measurement stop signal are supplied from the signal producing section to the high-speed counter.

14 Claims, 19 Drawing Sheets

[EX.3.5T→INTEGRAL VALUE:3 DECIMAL VALUE:0.5(n/2)]
T:PERIOD OF φ
n:RESOLUTION NUMBER mbit COUNTER VALUE SUM TOTAL: Σ =mbit COUNTER VALUE 1+mbit COUNTER VALUE 2+···+mbit COUNTER VALUE n MEAN VALUE : H= Σ/n
MEASURED TIME=H · T[T:PERIOD OF SYSTEM CLOCK φ]
V ARYING n IS DERIVED BY DETECTING THE NUMBER OF CONTINUED COUNTER VALUES OF LEAST SIGNIFICANT BITS OF mbit COUNTERS.

| LSB REF VALUE | | 0 | 1 | 0 | 0 | 1 | 1 | OUTPUT VALUE OF ONE-bit COUNTER SECT 16 | | | | | |
|---|---|---|---|---|---|---|---|---|---|---|---|---|---|
| COUNTER VALUE | | EX1 | EX2 | EX3 | EX4 | EX5 | EX6 | EX1 | EX2 | EX3 | EX4 | EX5 | EX6 |
| ONE-bit COUNTER | 1 | 0 | 1 | 1 | 1 | 1 | 0 | 0 | 0 | 1 | 1 | 0 | 1 |
| | 2 | 0 | 1 | 0 | 0 | 1 | 1 | 0 | 0 | 0 | 0 | 0 | 0 |
| | 3 | 0 | 1 | 0 | 0 | 1 | 1 | 0 | 0 | 0 | 0 | 0 | 0 |
| | 4 | 0 | 1 | 1 | 1 | 1 | 0 | 0 | 0 | 1 | 1 | 0 | 1 |
| | 5 | 0 | 1 | 1 | 1 | 1 | 0 | 0 | 0 | 1 | 1 | 0 | 1 |
| | ⋮ | | | ⋮ | | | | | | ⋮ | | | |
| | 19 | 0 | 1 | 1 | 1 | 1 | 0 | 0 | 0 | 1 | 1 | 0 | 1 |
| | 20 | 1 | 0 | 1 | 1 | 1 | 0 | 1 | 1 | 1 | 1 | 0 | 1 |
| | 21 | 0 | 1 | 1 | 1 | 1 | 0 | 0 | 0 | 1 | 1 | 0 | 1 |
| | 22 | 1 | 0 | 1 | 1 | 1 | 0 | 1 | 1 | 1 | 1 | 0 | 1 |
| | 23 | 1 | 0 | 1 | 1 | 1 | 0 | 1 | 1 | 1 | 1 | 0 | 1 |
| | ⋮ | | | ⋮ | | | | | | ⋮ | | | |
| | n-5 | 1 | 0 | 1 | 1 | 1 | 0 | 1 | 1 | 1 | 1 | 0 | 1 |
| | n-4 | 1 | 0 | 1 | 1 | 1 | 0 | 1 | 1 | 1 | 1 | 0 | 1 |
| | n-3 | 1 | 0 | 1 | 1 | 1 | 0 | 1 | 1 | 1 | 1 | 0 | 1 |
| | n-2 | 1 | 0 | 1 | 0 | 0 | 1 | 1 | 1 | 1 | 2 | 1 | 2 |
| | n-1 | 1 | 0 | 0 | 0 | 0 | 1 | 1 | 1 | 2 | 2 | 1 | 2 |
| | n | 1 | 0 | 1 | 1 | 1 | 0 | 1 | 1 | 1 | 1 | 0 | 1 |
| | n+1 | 1 | 0 | 0 | 0 | 0 | 1 | ※STOP OPERATION UP TO n-TH STAGE | | | | | |
| | n+2 | 1 | 0 | 0 | 0 | 0 | 1 | | | | | | |

n:RESOLUTION NUMBER

FIG.15
PRIOR ART

TIME MEASURING METHOD AND TIME MEASURING SYSTEM WHICH ENABLE TO DISCRIMINATE WHETHER OR NOT THE MEASUREMENT RESULT IS WITHIN THE REQUIRED MEASUREMENT

BACKGROUND OF THE INVENTION

The present invention relates to a time measuring system and a time measuring method.

Referring to FIGS. 9 and 10, description will be made at first as regards a conventional time measuring system of this type. The conventional time measuring system comprises a high-speed counter section 1 for counting up a counter value in response to a clock signal between supplies of a measurement start signal and a measurement stop signal to produce a counter output signal representative of the counter value, an adding section 2 connected to the high-speed counter section for executing an adding operation as regards the counter value by the use of the clock signal and the counter output signal to produce a sum total of the counter value, and a data producing section 3 connected to the adding section and the high-speed counter section for producing a resolution datum in response to the sum total by the use of the counter output signal.

The high-frequency pulse generator 1 has a structure as shown in FIG. 11 for achieving pulse processing faster (shorter) than the processing limit speed of a semiconductor product. However, there is a drawback that a counter value deviates by at least ±1. The reason for this is that when racing of inputs occurs at an input timing of a flip-flop, an output becomes unstable and it is unknown whether a level of the output is stabilized to high or low after a lapse of a time.

For solving this drawback, an averaging process is carried out using the sum total in which deviations of the counter values are corrected.

Specifically, relative to n signals obtained through different stages of delay buffers 105 in the high-frequency pulse generator 9, m-bit counters 10 ($m \geqq 4$) are provided in n stages (pipeline processing) for deriving an integral part of a mean counter value ($\Sigma/n$), and one-bit counters 11 are provided in n stages (pipeline processing) for deriving a decimal part of the mean counter value. Since each of the one-bit counters 11 lacks information about rise to unit from a first bit to a second bit, a first correction circuit 108 is provided as shown in FIG. 12 for carrying out ±1 correction to one-bit counter values of 1 and 0 of the one-bit counters 11 and outputting information about rise to unit when the one-bit counter values of the one-bit counters 11 change from 1 to 0.

However, using the one-bit counters for obtaining the decimal parts causes an error in the time measurement accuracy. The reason for occurrence of the error is that since the pipelined one-bit counters are individual circuits, respectively, assuming that the resolution number for the system clock is n, it is possible that each of the n one-bit counters takes three kinds of counter values, that is, Q, Q+1 or Q+2. The counter value of the one-bit counter can only be 0 or 1. For eliminating the error in the time measurement accuracy, a second correction circuit 109 is provided as shown in FIG. 12.

The second correction circuit 109 comprises a selector 110 for selecting a plurality of necessary counter values from among the n pipelined one-bit counter values of the one-bit counters 11, a D-FF 111 for latching a signal from the selector 110, a coincidence circuit 112 for comparing an output from the D-FF 111 and a value obtained by incrementing an output of the D-FF 111 through the coincidence circuit 112 and a D-FF 113, the D-FF 113 for latching an output of the coincidence circuit 112, a zero-detection circuit 114 for carrying out zero detection based on an output value of the D-FF 113 and an output value from a selector section 14 of an adding section 2 via the first correction circuit 108, and a selector 115 for selecting an output of the zero-detection circuit 114 and a counter value of a lower second bit of the m-bit counter 10 from the selector section 14 of the adding section 2, using a control signal for switching an operation process of the adding section 2 between the m-bit side and the one-bit side. By inputting an output of the selector 115 into the adding section 2, an operation of the counter value of Q+2 is made possible.

Subsequently, selection is carried out to derive the sum total of the counter values of the m-bit counters 10 and the sum total of the counter values of the one-bit counters 11. A comparator 118 compares the resolution number n derived at the MPU 102 and the number of addition times derived at an x-bit counter 117 of an operation times control circuit 116 as shown in FIG. 13. A comparison result from the comparator 118 is latched by a D-FF 119 so as to control the number of addition times of the one-bit counters 11.

The number of addition times of the counter values of the m-bit counters 10 is set in advance to be the number of the m-bit counters 10 to be used. The selector section 14 selects an addition times control signal for the m-bit counters 10 or the one-bit counters 11 so as to control the number of addition times.

The counter values of the m-bit counters 10 or the one-bit counters 11 from the selector section 14 are added through a D-FF 15, an ADD 16 a D-FF 17 and a D-FF 18 so as to derive the sum total of the counter values of the m-bit counters 10 or the one-bit counters 11. The derived sum total is stored in a register 19. The data stored in the register 19 are read and written in the MPU 20 at read/write timings of the MPU 20.

At the MPU 20, the sum total of the counter values of the m-bit counters 10 is divided by the number of m-bit counters 10 to be used. On the other hand, with respect to the counter values of the one-bit counters 11, the MPU 20 derives a resolution number n over a period of the clock f based on the number n of one-bit counters 12 (LSB's of the m-bit counters 10 are used, and the one-bit counters 11 are used), and the number of continued counter values of low or high among counter values of the register 19 for controlling the read/write timings of the MPU 20 and the n one-bit counters 12, and controls the number of addition times at the adding section 2 up to n.

Each of the delay buffers 105 used in the high-frequency pulse generator 9 of FIG. 11 is subjected to dispersion in delay time depending on the conditions of source voltage and temperature, and thus the resolution number n varies accordingly. In view of this, the MPU 20 divides the sum total of the counter values of the m-bit counters 10 and the sum total of the counter values of the one-bit counters 11 by the resolution number n so as to derive the mean values thereof, respectively.

The dispersion of the counter values of the pipelined m-bit counters 10 and the dispersion of the counter values of the pipelined one-bit counters 11 during one period of the clock $\phi$ are not greater than +1 or +2, respectively. Accordingly, the counter value of the one-bit counter 11 becomes a counter value of the one-bit counter 11 when the stage number of the delay buffer in the high-frequency pulse generator 9 of FIG. 11 is the smallest, a +1 counter value or a +2 counter value. The counter value including an element below decimal point becomes a counter value of an LSB or a value of a lower second bit subjected to the +2 correction at the second correction circuit 109 in FIG. 12.

The mean value of the thus derived decimal parts is derived, the mean value of the integral parts is added to the mean value of the decimal parts to derive the sum of the mean values, and this sum is multiplied by a period of the clock φ to derive a measured time.

As shown in FIGS. 10 and 14, in response to an input of a signal to be measured, the high-frequency pulse generator 9 produces enable signals EN1 to n, which control the start and the stop of the counting of the m-bit counters 10, the one-bit counters 11 and the one-bit counters 12, based on a given start command and given stop commands STOP1 to STOPn. For n-resolving the system clock φ, the given stop commands STOP1 to STOPn have n delay times.

The enable signals EN1 to n produced by the given stop commands STOP1 to STOPn are divided into two kinds of values, that is, low and high levels, by the high-frequency pulse generator 9 to control the start and the stop of the counting of the m-bit counters 10, the one-bit counters 11 and the one-bit counters 12 so that the m-bit counter 10 takes two kinds of counter values, that is, Q or Q+1, the one-bit counter 93 takes three kinds of counter values, that is, Q, Q+1 or Q+2, and the one-bit counter 12 takes two kinds of counter values, that is, 0 or 1.

At the MPU 20, the sum total of the counter values Q and Q+1 of the m-bit counters 10 and the counter values of Q, Q+1 and Q+2 of the one-bit counters 11 is divided by the resolution number n derived by the number of the continued values of 0 or 1 among the counter values of the one-bit counters 12 so as to derive a mean counter value, and the derived mean counter value is multiplied by a period of the system clock, so that it is possible to carry out the measurement with accuracy of time shorter than the system clock.

As shown in FIGS. 10, 12 and 15, since the one-bit counters 12 up to the resolution number n take three kinds of counter values of Q, Q+1 and Q+2, it is possible, by applying the +2 correction to one-bit counter values in FIG. 15 through the second correction circuit 109 in FIG. 12 and outputting them, to carry out the measurement with accuracy of time shorter than the system clock using the decimal part counters of one-bit structure. FIGS. 16A and 16B are flowcharts showing operations of the time measuring system shown in FIG. 10.

In the foregoing conventional technique, since the delay buffers are used in a plurality of stages for deriving the values of counting shorter than a period of the system clock (hereinafter also referred to as "decimal parts"), the time measurement accuracy is determined by a delay time per stage of the delay buffer. On the other hand, the delay time of the delay buffer is dispersed in a magnitude of several times due to change in environment, such as temperature or voltage. Accordingly, the dispersion of the delay time of the delay buffer is considered upon designing in view of the operation temperature range and the operation voltage range so as to obtain the required time measurement accuracy. However, since the measurement accuracy is not measured in actual use, a control can not be performed for the case where the required time measurement accuracy is not obtained. Therefore, in the time measuring system or in an extended system using the time measuring system, even if the required time measurement accuracy is not obtained, the time measuring system only outputs the measurement result to, in the extended system, peripheral systems.

Thus, it is possible that the measurement result is not within the required measurement accuracy, and further, it can not be discriminated whether the measurement result is within the required measurement accuracy or not.

SUMMARY OF THE INVENTION

It is therefore an object of this invention to provide a time measuring system and method which enable to discriminate whether or not the measurement result is within the required measurement accuracy.

Other objects of this invention will become clear as the description proceeds.

According to the present invention, there is provided a time measuring system which comprises a high-speed counter section for counting up a counter value in response to a clock signal between supplies of a measurement start signal and a measurement stop signal to produce a counter output signal representative of said counter value, an adding section connected to said high-speed counter section for executing an adding operation as regards said counter value by the use of said clock signal and said counter output signal to produce a sum total of said counter value, a data producing section connected to said adding section and said high-speed counter section for producing a resolution datum in response to said sum total by the use of said counter output signal, and a signal producing section connected to said data producing section, said adding section, and said high-speed counter section and supplied with a measurement able/disable switching signal and with an original stop signal for producing said measurement start signal and said measurement stop signal by the use of said measurement able/disable switching signal, said original stop signal, said resolution datum, said sum total, and said clock signal to supply said measurement start signal and said measurement stop signal to said high-speed counter.

According to the present invention, there is further provided a time measuring method by the use of a time measuring system, comprising a first step of initializing said time measuring system, a second step of starting a mode of measuring a resolution number based on measurement of an actual value relative to the measurement reference value, a third step of setting the measurement reference value and producing a measurement object signal corresponding to the measurement reference value, a fourth step of, upon receipt of the measurement object signal from the third step, starting count in response to a given start command, a fifth step of stopping the count in response to a given stop command, a sixth step of, after the stop of the count at the fifth step, start addition of counter values at given integral parts, a seventh step of deriving the sum total of the integral part counter values through a given number of times of the addition and stopping the addition, an eighth step of, after the stop of the addition at the seventh step, dividing the sum total of the integral part counter values by the given number of times of the addition to derive a first mean value, a ninth step of correcting the first mean value to derive a first corrected mean value, a tenth step of holding the first corrected mean value, an eleventh step of, after the stop of the count at the fifth step, performing +1 correction, based on discrimination of rise to unit of counter values of decimal parts, relative to those decimal part counter values, a twelfth step of, based on discrimination of continued equal counter values of the decimal parts, performing +2 correction to those decimal part counter values, a thirteenth step of starting addition of the decimal parts, a fourteenth step of, after the stop of the counting at the fifth step, measuring the resolution number, a fifteenth step of holding the measured resolution number, a sixteenth step of, after the holding of the resolution number at the fifteenth step, adding the corresponding counter values by a given number of times corresponding to the resolution number so as to derive the sum total of the counter values of the decimal parts, a seventeenth step of stopping the addition of the decimal parts, an eighteenth step of, after the stop of the addition at the seventeenth step, dividing the sum total of the decimal part counter values by the resolution number to derive a second mean value, a nineteenth step of correcting the second mean value to derive a second corrected mean value, a twentieth step of holding the second corrected mean value, a twenty-first step of adding the first corrected mean value held at the tenth step and the second corrected mean value held at the twentieth step to derive a third mean value, a twenty-second step of comparing the measurement reference value set at the third step and the third mean value derived at the twenty-first step to determine whether a difference between the measurement reference value and the third mean value is in a given measurement accuracy range, a twenty-third step of, if answer at the twenty-second step is negative, counting the number of times of the comparison at the twenty-second step to determine whether the number of times of the comparison at the twenty-second step has reached a given number of times, a twenty-fourth step of, if answer at the twenty-third step is positive, stopping the system, a twenty-fifth step of, if answer at the twenty-second step is positive, initializing a counter section, a twenty-sixth step of starting a mode of measuring an actual value in response to an input of a signal to be measured, a twenty-seventh step of starting count in response to a given start command, a twenty-eighth step of stopping the count in response to a given stop command, a twenty-ninth step of, after the stop of the count at the twenty-eighth step, starting addition of counter values at given integral parts, a thirtieth step of deriving the sum total of the integral part counter values through the given number of times of the addition and stopping the addition, a thirty-first step of, after the stop of the addition at the thirtieth step, dividing the sum total of the integral part counter values by the given number of times of the addition to derive a fourth mean value, a thirty-second step of correcting the fourth mean value to derive a third corrected mean value, a thirty-third step of holding the third corrected mean value, a thirty-fourth step of, after the stop of the count at the twenty-eighth step, performing +1 correction, based on discrimination of rise to unit of counter values of decimal parts, relative to those decimal part counter values, a thirty-fifth step of, based on discrimination of continued equal counter values of the decimal parts, performing +2 correction to those decimal part counter values, a thirty-sixth step of starting addition of the decimal parts, a thirty-seventh step of adding the counter values corresponding to the resolution number held at the fifteenth step by the given number of times corresponding to the resolution number so as to derive the sum total of the counter values of the decimal parts, a thirty-eighth step of stopping the addition of the decimal parts, a thirty-ninth step of, after the stop of the addition at the thirty-eighth step, dividing the sum total of the decimal part counter values by the resolution number to derive a fifth mean value, a fortieth step of correcting the fifth mean value to derive a fourth corrected mean value, a forty-first step of holding the fourth corrected mean value, a forty-second step of adding the third corrected mean value held at the thirty-third step and the fourth corrected mean value held at the forty-first step to derive a sixth mean value, and a forty-third step of deriving a measured time by multiplication between the sixth mean value and a period of a system clock pulse.

BRIEF DESCRIPTION OF THE DRAWING

FIG. 15 is a truth table with respect to FIGS. 10 and 11;

DESCRIPTION OF THE PREFERRED EMBODIMENT

Figure 1:
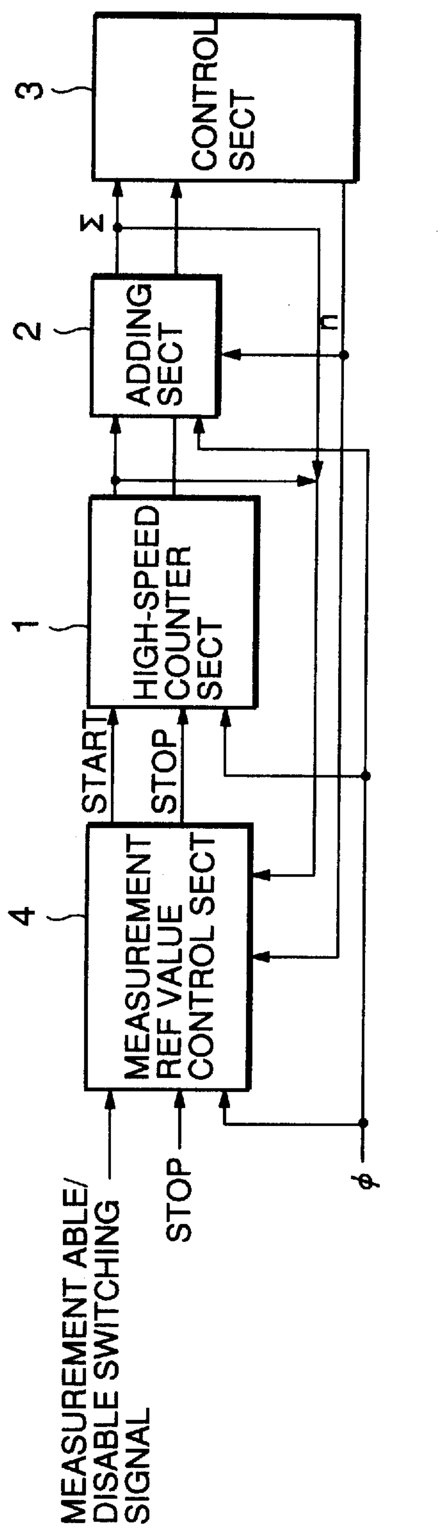
FIG. 1 is a structural diagram of a time measuring system according to a preferred embodiment of the present invention.

Now, a preferred embodiment of the present invention will be described hereinbelow in detail with reference to the drawing.

Referring to FIG. 1, a time measuring system according to the preferred embodiment of the present invention comprises a high-speed counter section 1 which is controlled by a measurement start signal and a measurement stop signal, an adding section 2 which uses a clock signal used in the high-speed counter section 1 and outputs of the high-speed counter section 1 to output the sum total of counter values of the clock signal, a data producing section, or control section 3 which derives resolution data from the sum total obtained by the adding section 2 and outputs it, and a signal producing section, or measurement reference value control section 4 which produces a measurement start signal and a measurement stop signal relative to a preset time, outputs a difference between a measurement reference value of the preset time and the sum total obtained by the adding section 2 using the resolution data from the control section 3 to control sending of the measurement start signal, and selects a measurement stop signal inputted from the exterior of the time measuring system or the measurement stop signal relative to the foregoing preset time to output it to the high-speed counter section 1.

The time measuring system has functions of making a comparison or deriving a difference between the measurement reference value produced per time measurement at the measurement reference value control section 4 and a measured time value obtained by deriving a value from the measurement start to the measurement stop using the sum total from the adding section 2 and the resolution data from the control section 3 so as to determine whether the measurement accuracy necessary for the time measuring system is satisfied, and carrying out measurement relative to the measurement stop signal inputted from the exterior of the time measuring system or carrying out remeasurement relative to the foregoing preset time to make a comparison or derive a difference relative to the foregoing measurement reference value so as to determine whether the measurement accuracy required for the time measuring system is satisfied, or stopping the time measuring system to give an alarm.

Now, an operation of the time measuring system according to this embodiment will be described with reference to FIGS. 8A to 8D. Step 42 initializes the time measuring system. Step 43 starts a mode of measuring a resolution number n1 by measuring an actual value relative to the measurement reference value. Step 44 sets the measurement reference value and produces a measurement object signal corresponding to the measurement reference value. Step 45 starts counting relative to the measurement object signal from step 44 in response to a given start command. Step 46 stops the counting in response to a given stop command. Subsequent to the stop of the counting at step 46, step 47 starts adding counter values at given integral parts. Step 49 derives the sum total Σ1 of the integral part counter values 1 to n2 through the predetermined number of addition times (n2) and stops the addition.

Then, step 50 performs an averaging process, that is, divides the sum total Σ1 of the integral part counter values by the foregoing number of addition times (n2) to derive a mean value H1. Subsequently, step 51 corrects the mean value H1 by deleting a decimal part of H1 so as to derive an integral part h1. Then, step 52 holds the integral part h1 derived at step 51. Subsequently, step 54 discriminates rise to unit of counter values of decimal parts, and performs +1 correction to these decimal part counter values. Then, step 55 discriminates continued equal counter values of the decimal parts, and performs +2 correction to these decimal part counter values. Subsequently, step 56 starts adding the decimal parts. After the stop of the counting at step 46, step 48 measures the resolution number n1. Then, step 53 holds the measured resolution number n1.

After the holding of the resolution number n1 at step 53, step 57 adds the corresponding counter values by a given number of times corresponding to the resolution number n1 so as to derive the sum total Σ2 of the counter values of the decimal parts. Then, step 58 stops the addition. Subsequently, step 59 performs an averaging process, that is, divides the sum total Σ2 of the decimal part counter values by the foregoing resolution number n1 to derive a mean value H2. Then, step 60 corrects the mean value H2 by deleting an integral part of H2 so as to derive a decimal part h2. Subsequently, step 61 holds the decimal part h2 derived at step 60. Then, step 62 adds h1 held at step 52 and h2 held at step 61 to derive a mean value H of the counter values. Subsequently, step 63 compares the measurement reference value S set at step 44 and the mean value H derived at step 62 and determines whether a difference between S and H is in the range of ±given measurement accuracy [S−H≧±MA (measurement accuracy)].

If answer at step 63 is negative, step 64 counts the number of times K of the comparison at step 63 and determines whether K has reached a given number of times (GNT). If answer at step 64 is positive, step 65 stops the system. On the other hand, if answer at step 63 is positive, step 66 initializes the counter section. Then, step 67 starts a mode of measuring an actual value in response to an input of a signal to be measured. Subsequently, step 68 starts counting in response to a given start command, and step 69 stops the counting in response to a given stop command. Subsequent to the stop of the counting at step 69, step 70 starts adding counter values at given integral parts. Step 71 derives the sum total Σ1 of the integral part counter values 1 to n2 through the predetermined number of addition times (n2) and stops the addition.

Then, step 72 performs an averaging process, that is, divides the sum total Σ1 of the integral part counter values by the foregoing number of addition times (n2) to derive a mean value H1. Subsequently, step 73 corrects the mean value H1 by deleting a decimal part of H1 so as to derive an integral part h1. Then, step 74 holds the integral part h1 derived at step 73. Subsequently, step 75 discriminates rise to unit of counter values of decimal parts, and performs +1 correction to these decimal part counter values. Then, step 76 discriminates continued equal counter values of the decimal parts, and performs +2 correction to these decimal part counter values. Subsequently, step 77 starts adding the decimal parts. Then, step 78 adds the counter values corresponding to the resolution number n1 held at step 53 by a given number of times corresponding to the resolution number n1 so as to derive the sum total Σ2 of the counter values of the decimal parts. Then, step 79 stops the addition. Subsequently, step 80 performs an averaging process, that is, divides the sum total S2 of the decimal part counter values by the foregoing resolution number n1 to derive a mean value H2. Then, step 81 corrects the mean value H2 by deleting an integral part of H2 so as to derive a decimal part h2.

Subsequently, step 82 holds the decimal part h2 derived at step 81. Then, step 83 adds h1 held at step 74 and h2 held at step 82 to derive a mean value H of the counter values. Subsequently, step 84 derives a measured time A by multiplication between the mean value H and a period T of the system clock pulse φ (A=H·T).

With the foregoing arrangement, the time measuring system can be provided with functions of having its own arbitrary measurement reference value and deriving a difference between the measurement reference value and a time value measured by the system itself so as to determine whether the measurement accuracy necessary for the system is satisfied, or stop the system to give an alarm.

Hereinbelow, the time measuring system according to this embodiment will be described in further detail.

Figure 2:
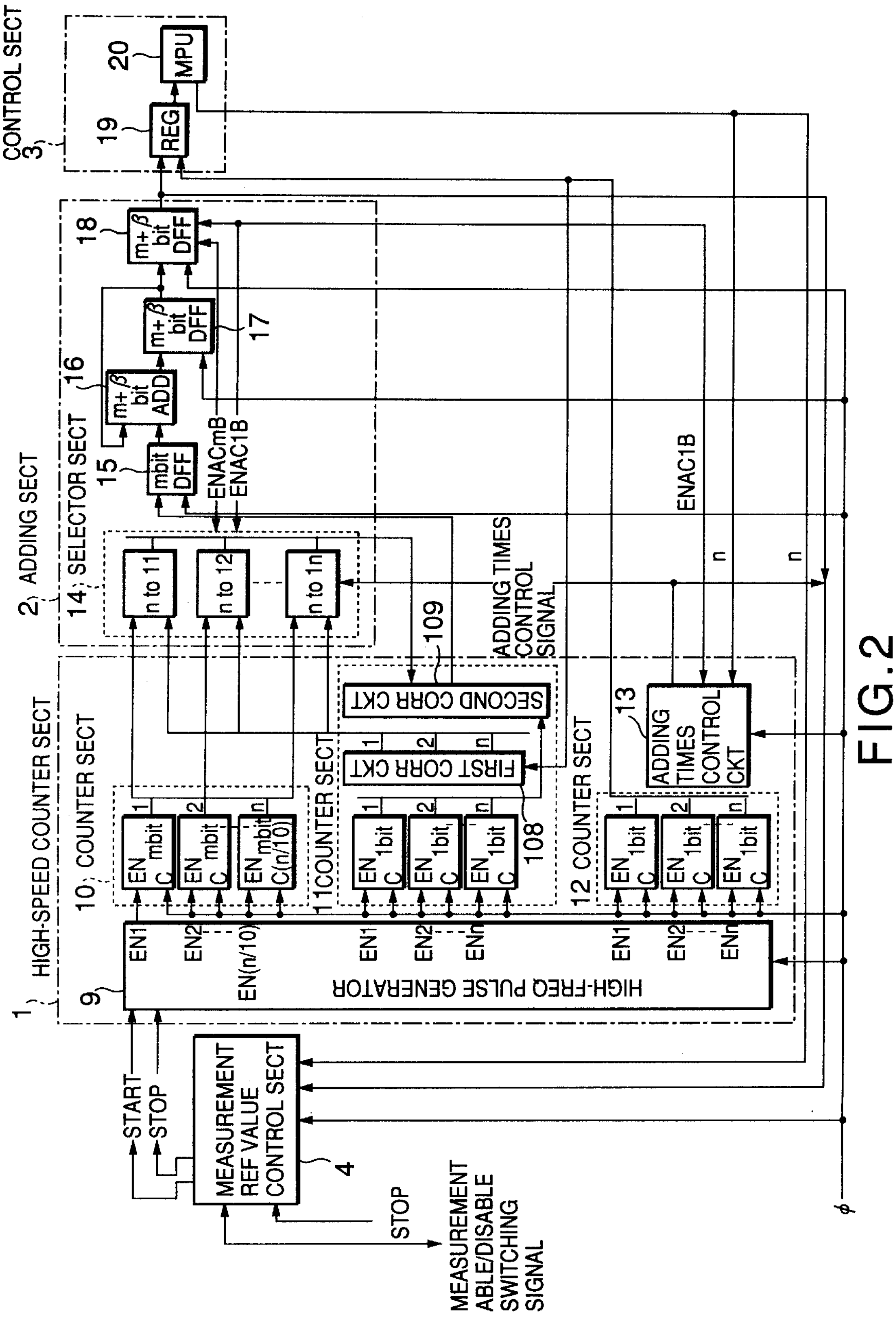
FIG. 2 is a circuit diagram showing an example of the time measuring system shown in FIG. 1 according to the present invention.
Figure 3:
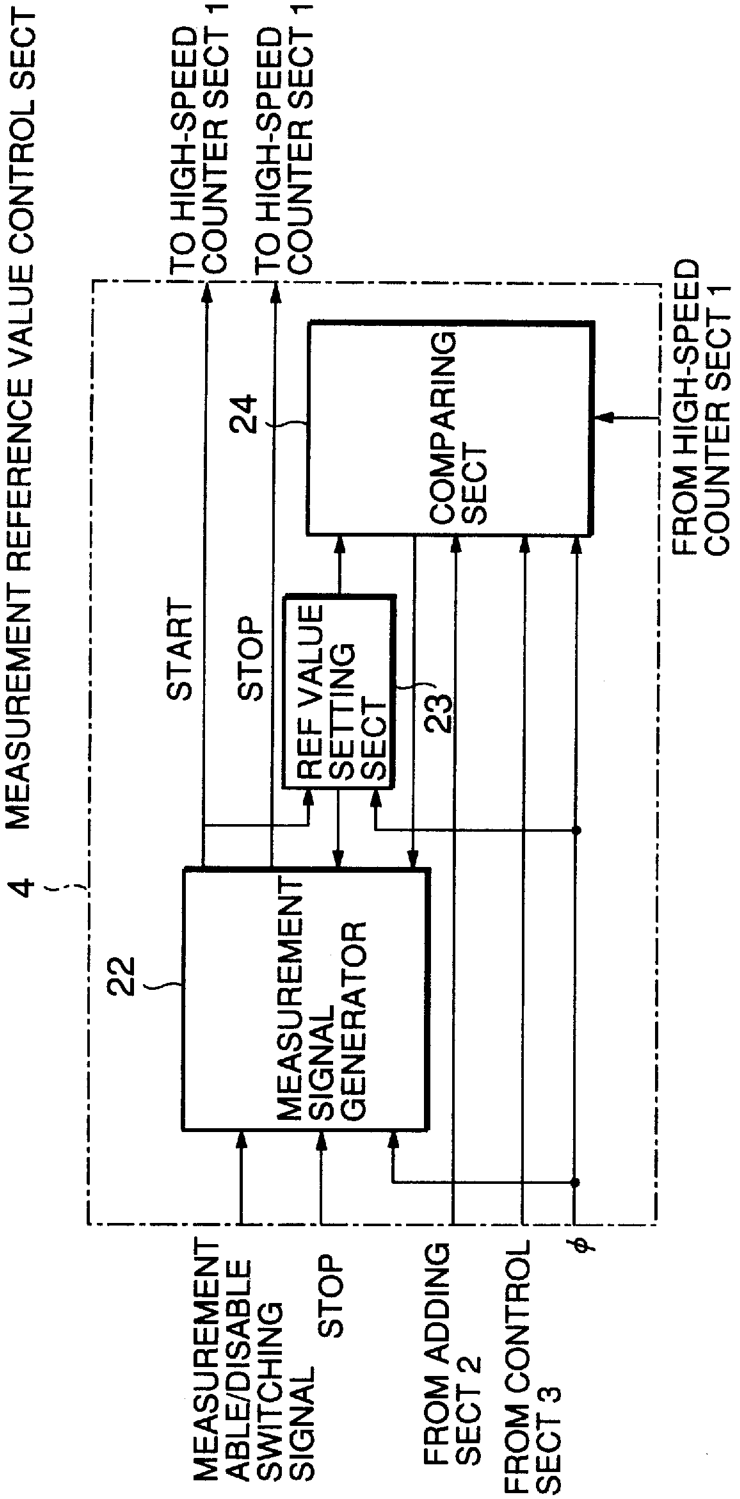
FIG. 3 is a circuit diagram showing an example of a measurement reference value control section according to the present invention.
Figure 4:
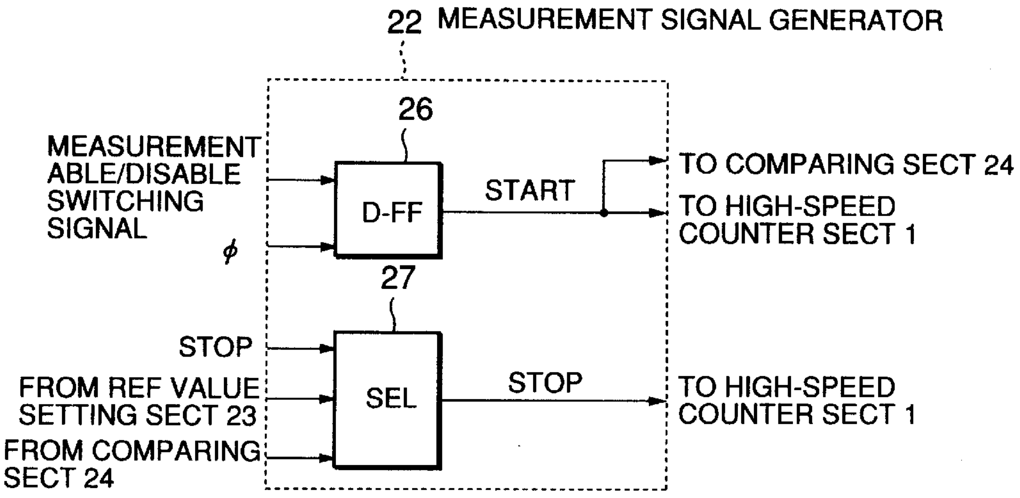
FIG. 4 is a circuit diagram showing an example of a measurement signal generator according to the present invention.
Figure 5:
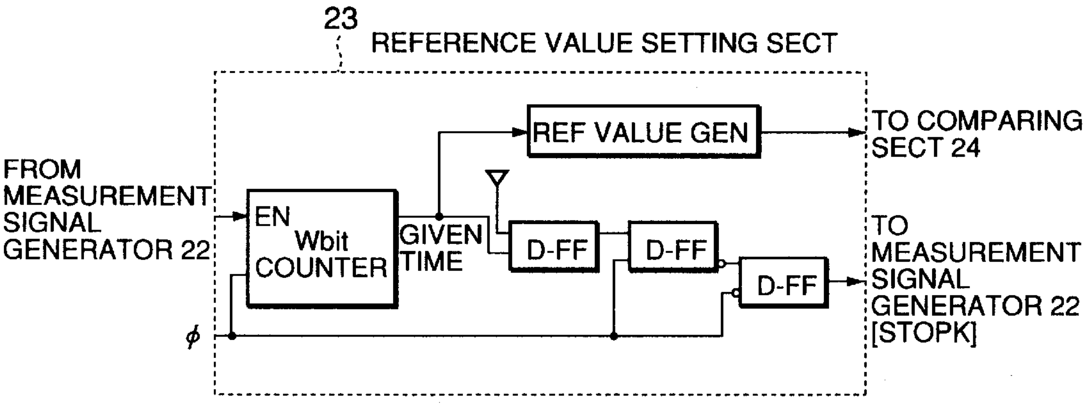
FIG. 5 is a circuit diagram showing an example of a reference value setting section according to the present invention.
Figure 6:
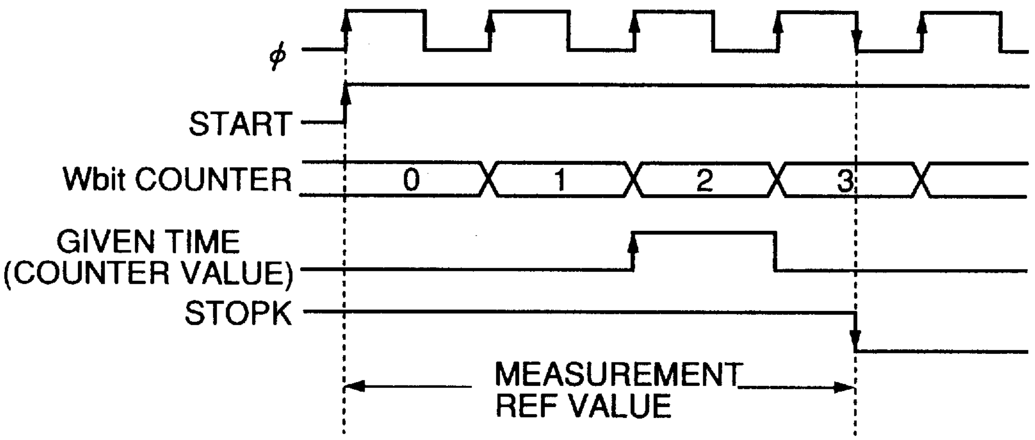
FIG. 6 is an operation chart of the circuit shown in FIG. 5.
Figure 7:
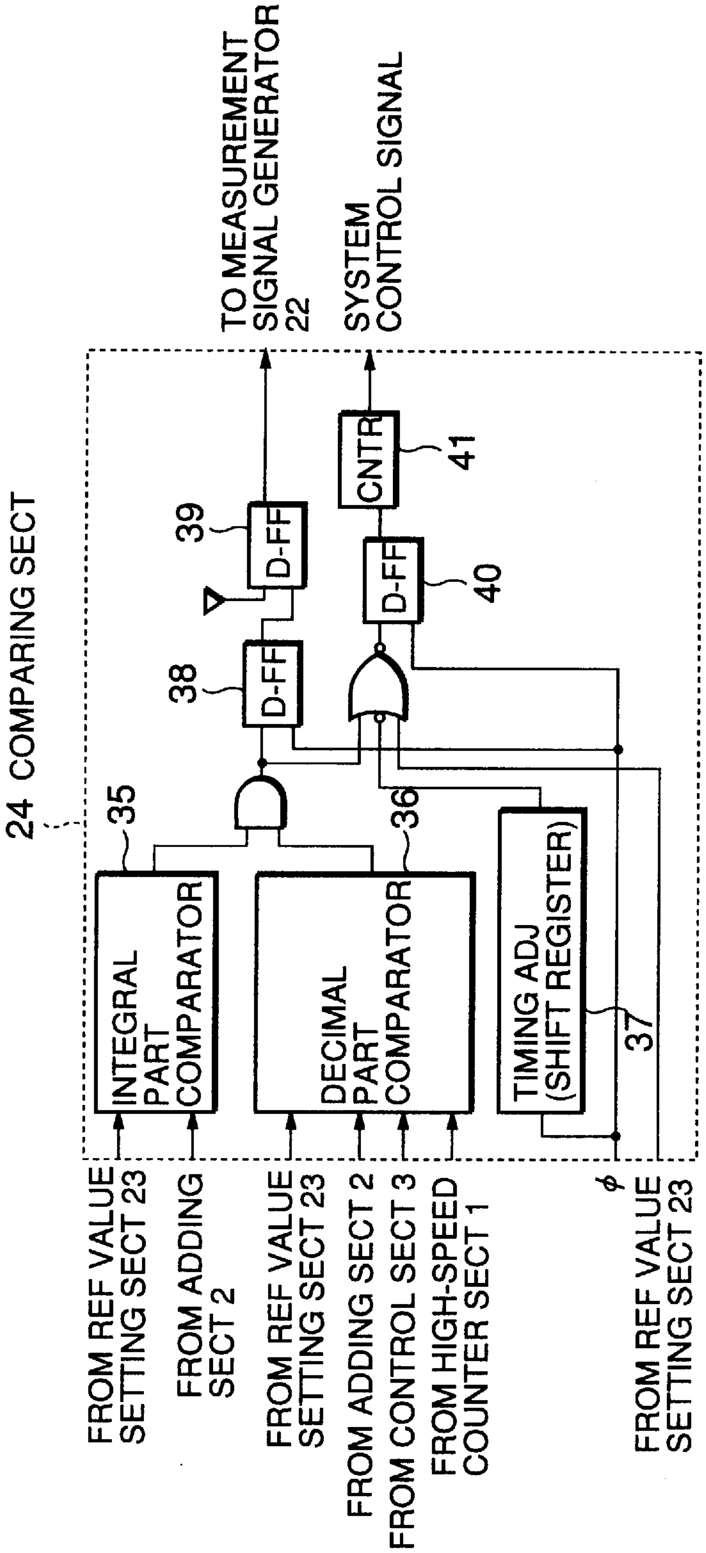
FIG. 7 is a circuit diagram showing an example of a comparing section according to the present invention.
Figure 8A:
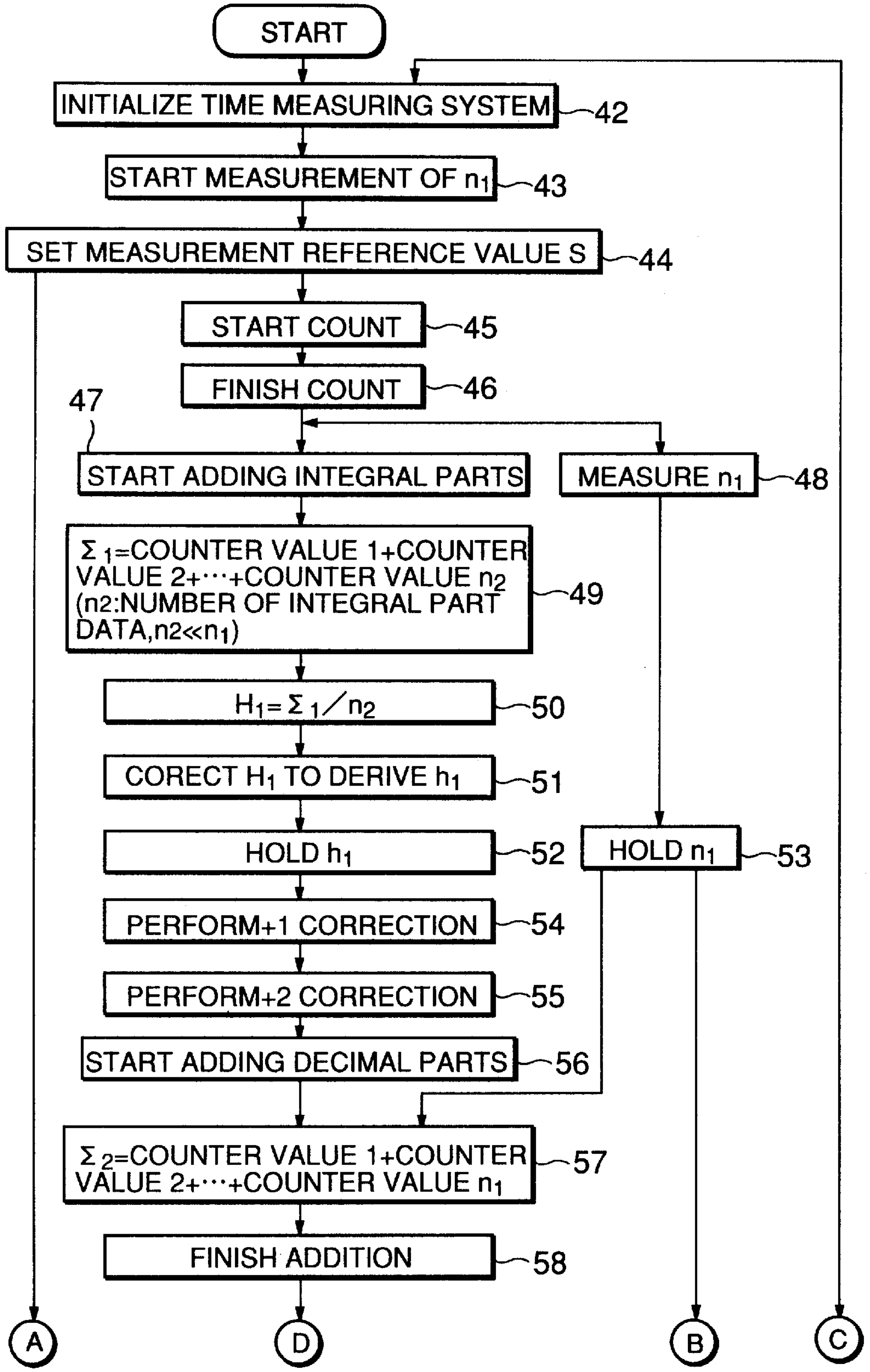
FIG. 8A is a flowchart showing an operation of the time measuring system according to the preferred embodiment of the present invention.
Figure 8B:
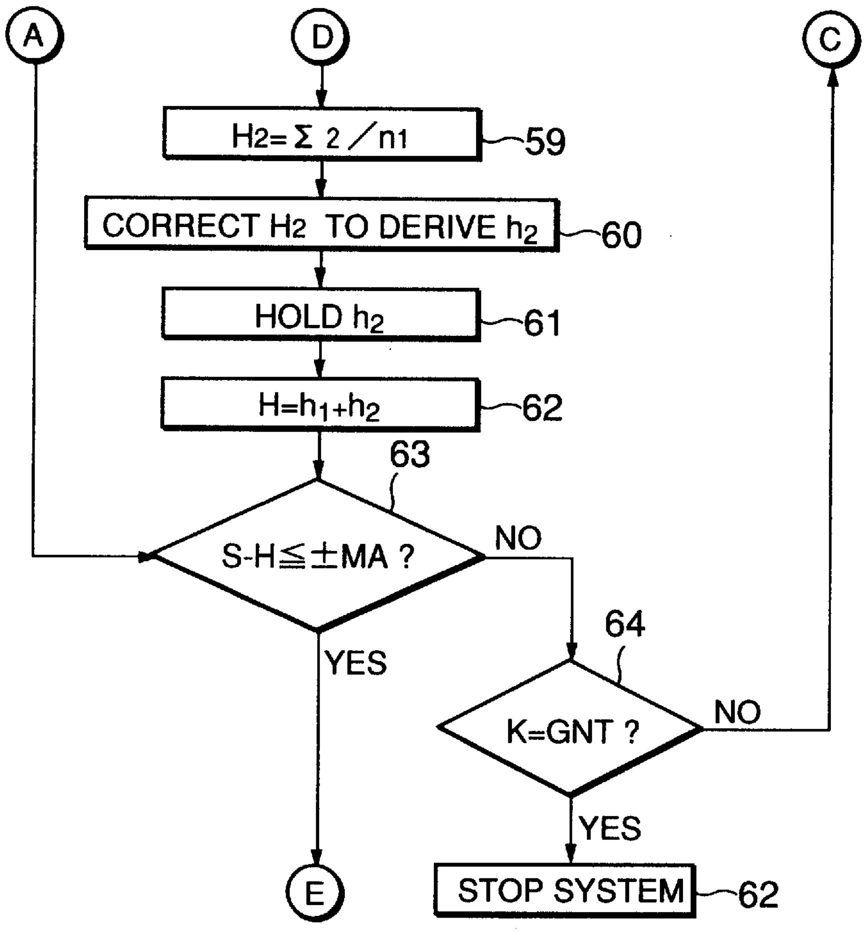
FIG. 8B is a flowchart showing an operation of the time measuring system according to the preferred embodiment of the present invention.
Figure 8C:
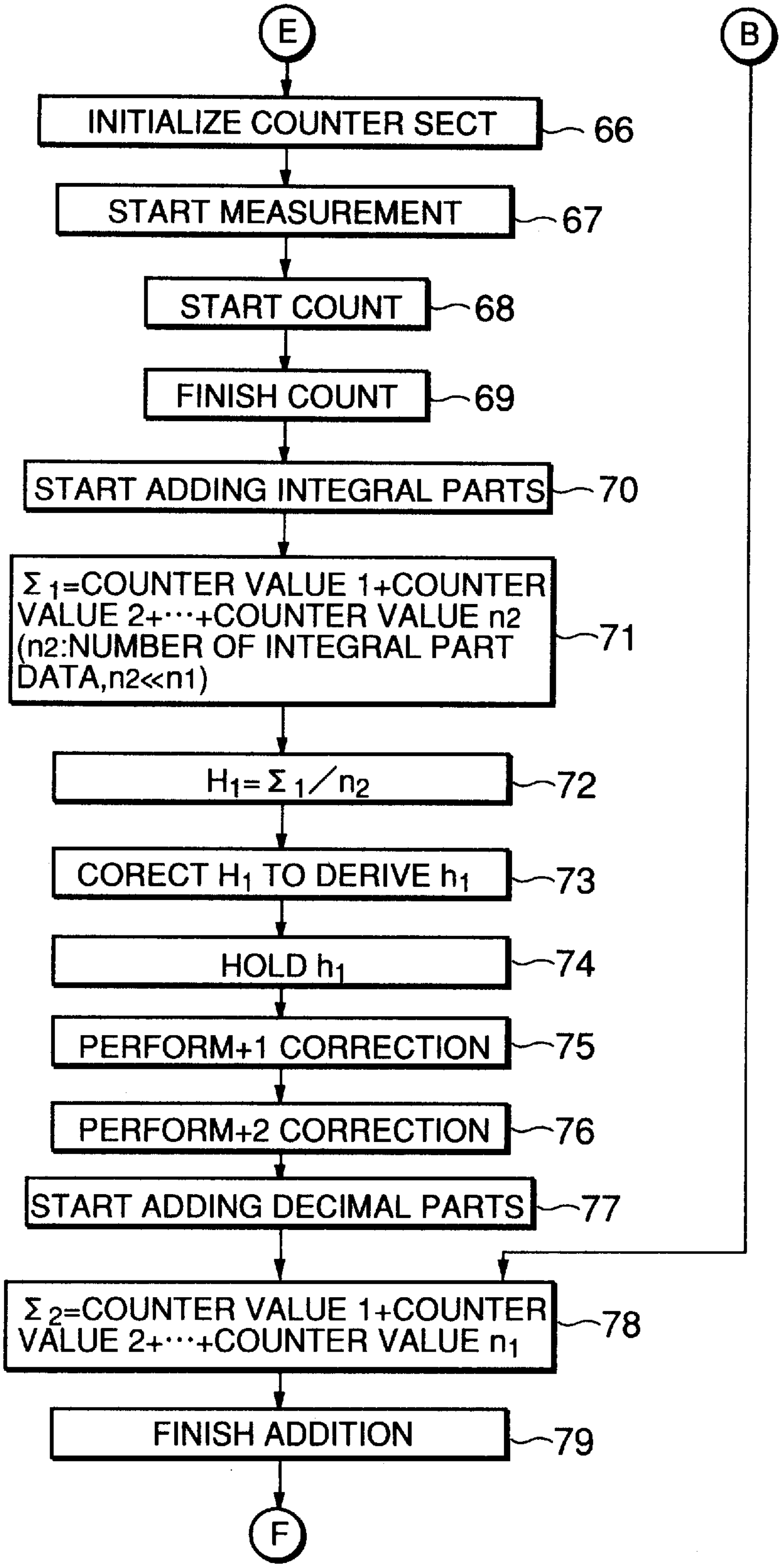
FIG. 8C is a flowchart showing an operation of the time measuring system according to the preferred embodiment of the present invention.
Figure 8D:
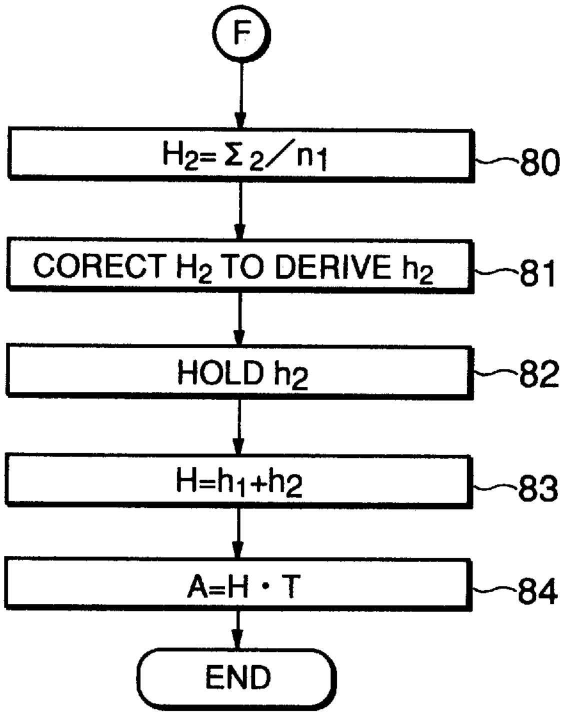
FIG. 8D is a flowchart showing an operation of the time measuring system according to the preferred embodiment of the present invention.
Figure 9:
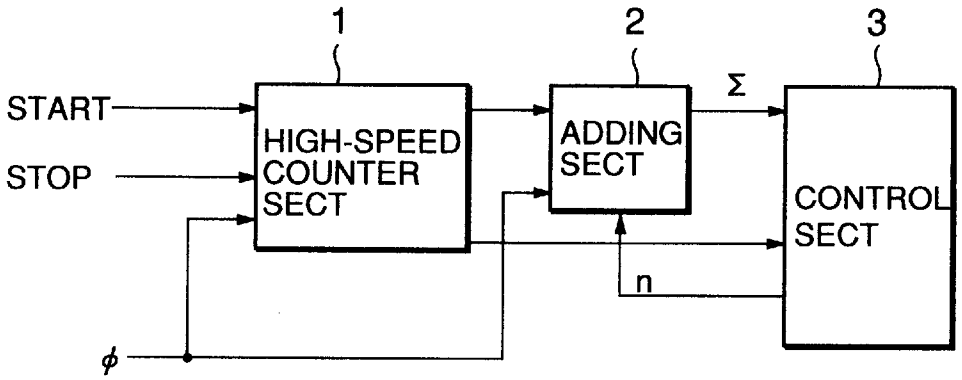
FIG.9 PRIOR ART
FIG. 9 is a structural diagram of a conventional time measuring system.
Figure 10:
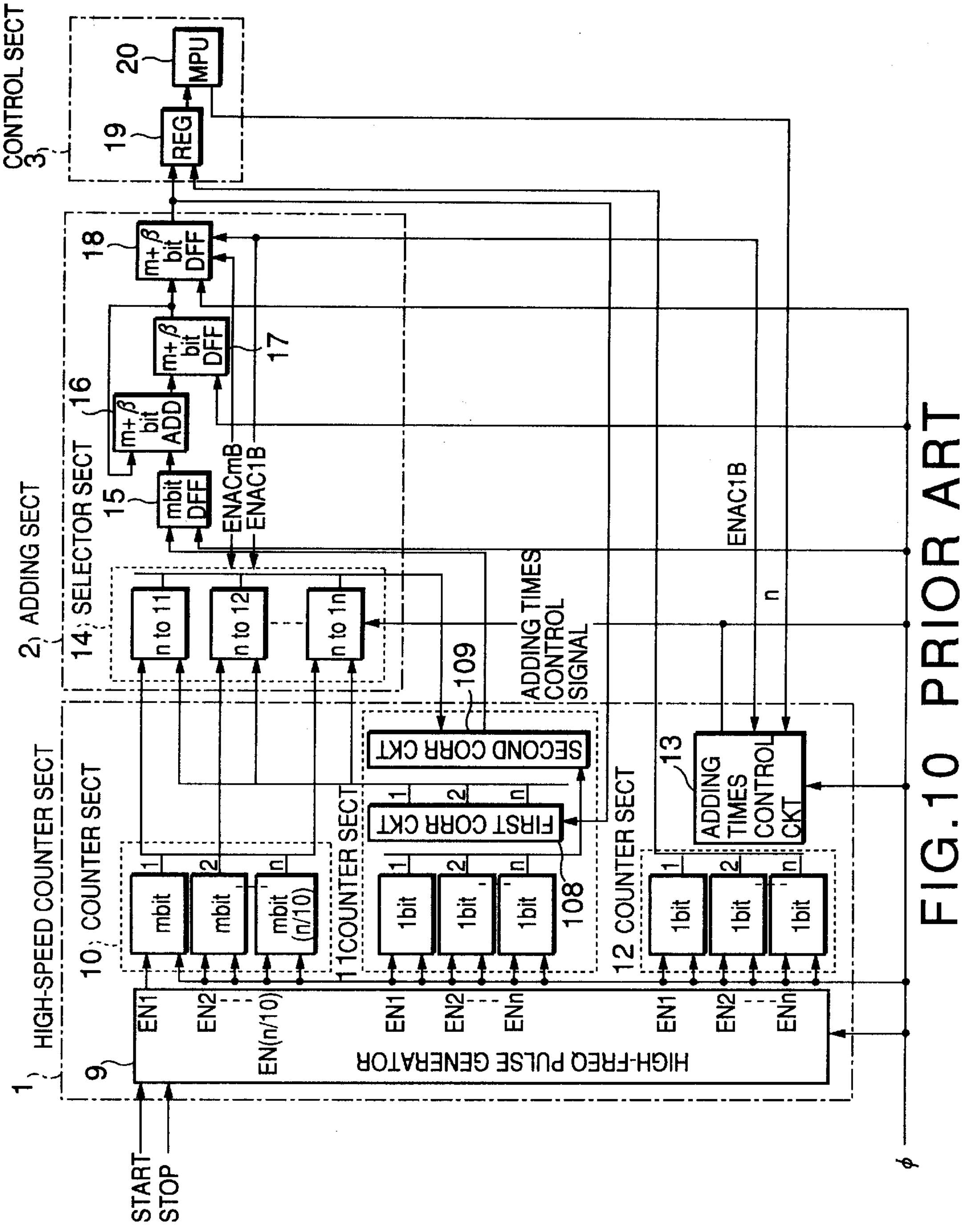
FIG.10 PRIOR ART
FIG. 10 is a circuit diagram of the conventional time measuring system.

FIG. 1 is a structural diagram of the time measuring system according to this embodiment. FIG. 2 is a circuit diagram showing an example of the time measuring system shown in FIG. 1. FIG. 3 is a circuit diagram showing an example of a measurement reference value control section. FIG. 4 is a circuit diagram showing an example of a measurement signal generator. FIG. 5 is a circuit diagram showing an example of a reference value setting section. FIG. 6 is an operation chart of the circuit shown in FIG. 5. FIG. 7 is a circuit diagram showing an example of a comparing section.

Figure 11:
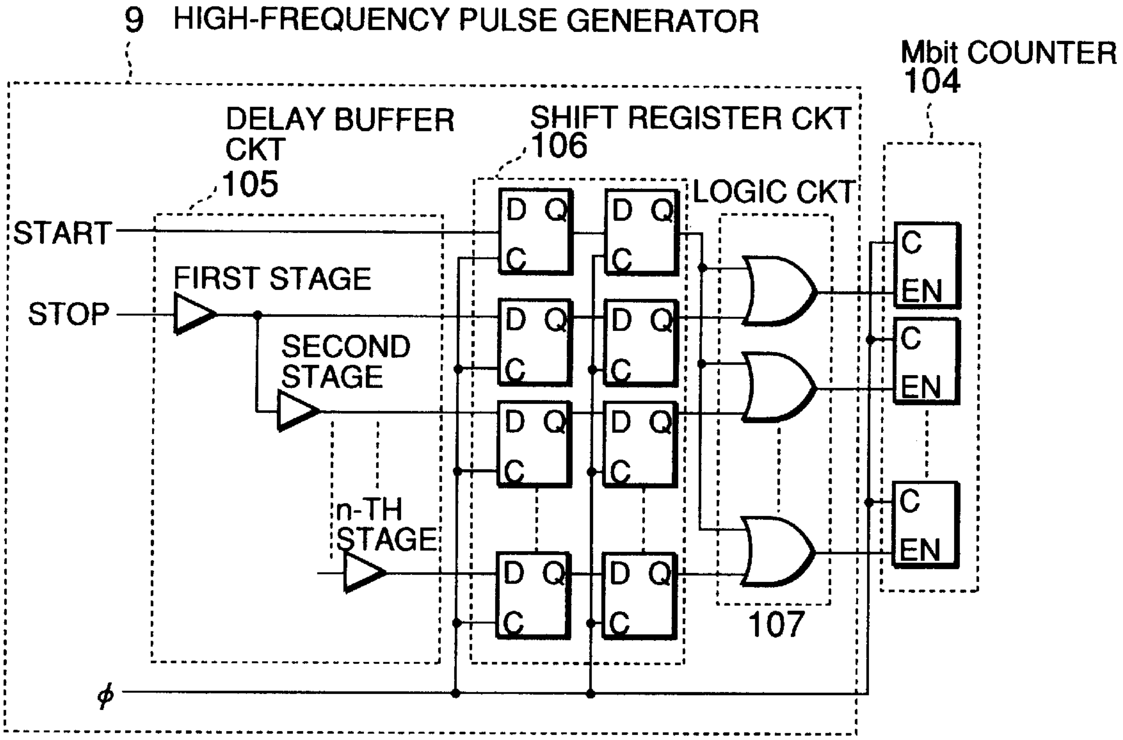
FIG.11 PRIOR ART
FIG. 11 is a structural diagram of a conventional circuit for resolving one clock period.

For achieving pulse processing faster (shorter) than the processing limit speed of a semiconductor product, the high-frequency pulse generator 103 of FIG. 11 being a circuit structure of a high-frequency pulse generator 9 of FIG. 2 is used. However, there are drawbacks that since each of the delay buffers of the delay buffer circuit 105 in the high-frequency pulse generator 103 of FIG. 11 is subjected to dispersion due to source voltage fluctuation and temperature fluctuation, the time measurement accuracy is in the range of the dispersion of the delay buffers so that a measurement accuracy value per time measurement can not be known and that a counter value deviates by at least ±1.

The reason why the measurement accuracy per time measurement can not be known is that although each delay buffer is subjected to dispersion due to source voltage fluctuation and temperature fluctuation to cause the time measurement accuracy to be in the range of the dispersion of the delay buffers, measurement of the time measurement accuracy per time measurement is not carried out in the time measuring system.

For solving these drawbacks, in this embodiment, the time measuring system has its own measurement reference value, produces a measurement start signal and a measurement stop signal corresponding to the measurement reference value, and derives a difference between the measurement reference value and a time value measured by the high-frequency pulse generator 103 of FIG. 11.

Specifically, in a measurement signal generator 22 of a measurement reference value control section 4 in FIG. 3 being a circuit structure of a measurement reference value control section 8 of FIG. 2, a D-FF 26 of a measurement signal generator 22 in FIG. 4 being a circuit structure of the measurement signal generator 22 in FIG. 3 latches a measurement able/disable switching signal using the clock signal $\phi$ and outputs it as the measurement start signal.

In response to the measurement start signal, when a Wbit counter 29 in a reference value setting section 23 of FIG. 5 being a circuit structure of a reference value setting section 23 in FIG. 3 reaches a given counter value, a D-FF 30 outputs a given value and a D-FF 31 latches the given value using an edge, in the same direction as those edges used in the Wbit counter 29, of the clock signal f. Then, a D-FF 32 latches the value held at the D-FF 31 using an inverse edge of the clock signal $\phi$ and outputs it as the measurement stop signal to a selector 27 in the measuring signal generator 22 of FIG. 4 being the circuit structure of the measurement signal generator 22. A reference value generator 33 generates a measurement reference value from the counter value of the Wbit counter 29 and the latch timings of the D-FF 30, the D-FF 31 and the D-FF 32 and outputs it to a comparing section 24.

In response to the measurement stop signal relative to the measurement reference value, the selector 27 in the measuring signal generator 22 of FIG. 4 being the circuit structure of the measurement signal generator 22 selects a measurement stop signal, based on an actual measurement, from the exterior of the time measuring system or the measurement stop signal relative to the measurement reference value from the D-FF 32 in the reference value setting section 23 of FIG. 5 being the circuit structure of the reference value setting section 23, using a measurement mode switching signal from the comparing section 24, and outputs it to the high-speed counter section 1.

On the other hand, as show in FIG. 6, the measurement reference value from the reference value generator 33 is divided into an integral part value and a decimal part value. Since the decimal part value is the measurement stop signal relative to the measurement reference value latched by the D-FF 32 using the inverse edge of the clock signal, a value half the resolution number (a value obtained by shifting the resolution data by one bit) from a MPU 20 in FIG. 2 is used therefor.

An integral part comparator 35 in a comparing section 24 of FIG. 7 being a circuit structure of the comparing section 24 in FIG. 3 compares an integral part of the measurement reference value from the reference value generator 33 and a mean value of integral parts from the adding section 2. Then, a decimal part comparator 36 in the comparing section 24 of FIG. 7 being the circuit structure of the comparing section 24 in FIG. 3 determines whether the value half the resolution number from the MPU 20 and the sum total of the decimal parts from the adding section 2 are within a given necessary measurement accuracy corresponding to the resolution number. Then, a logical operation is executed between an output of the integral part comparator 35 and an output of the decimal part comparator 36, and a D-FF 38 latches a result of the logical operation using the clock signal. A D-FF 39 outputs a given value, depending on the signal latched at the D-FF 38, to the measurement signal generator 22 as a measurement mode switching signal.

Further, a logical operation is executed among the foregoing result of the logical operation between the output of the integral part comparator 35 and the output of the decimal part comparator 36, a value obtained, through a timing adjuster 37, by matching the timing of an addition invalid signal from the high-speed counter section 1 relative to the data obtained through the measurement accuracy selection of the actual values measured by the high-speed counter section 1 and the adding section 2, and the measurement reference value latched by the D-FF 32 using the inverse edge of the clock signal. Then, a D-FF 40 latches a result of the logical operation using the clock signal, and a counter 41 carries out counting relative to the signal latched at the D-FF 40. By setting the limit to the counter value of the counter 41, it is possible to remeasure the measurement accuracy or stop the time measuring system to give an alarm.

The reason why the counter value deviates by at least ±1 is that when racing of inputs occurs at an input timing of a flip-flop, an output becomes unstable and it is unknown whether a level of the output is stabilized to high or low after a lapse of a time.

For solving this drawback, an averaging process is carried out using the sum total in which deviations of the counter values are corrected.

Figure 12:
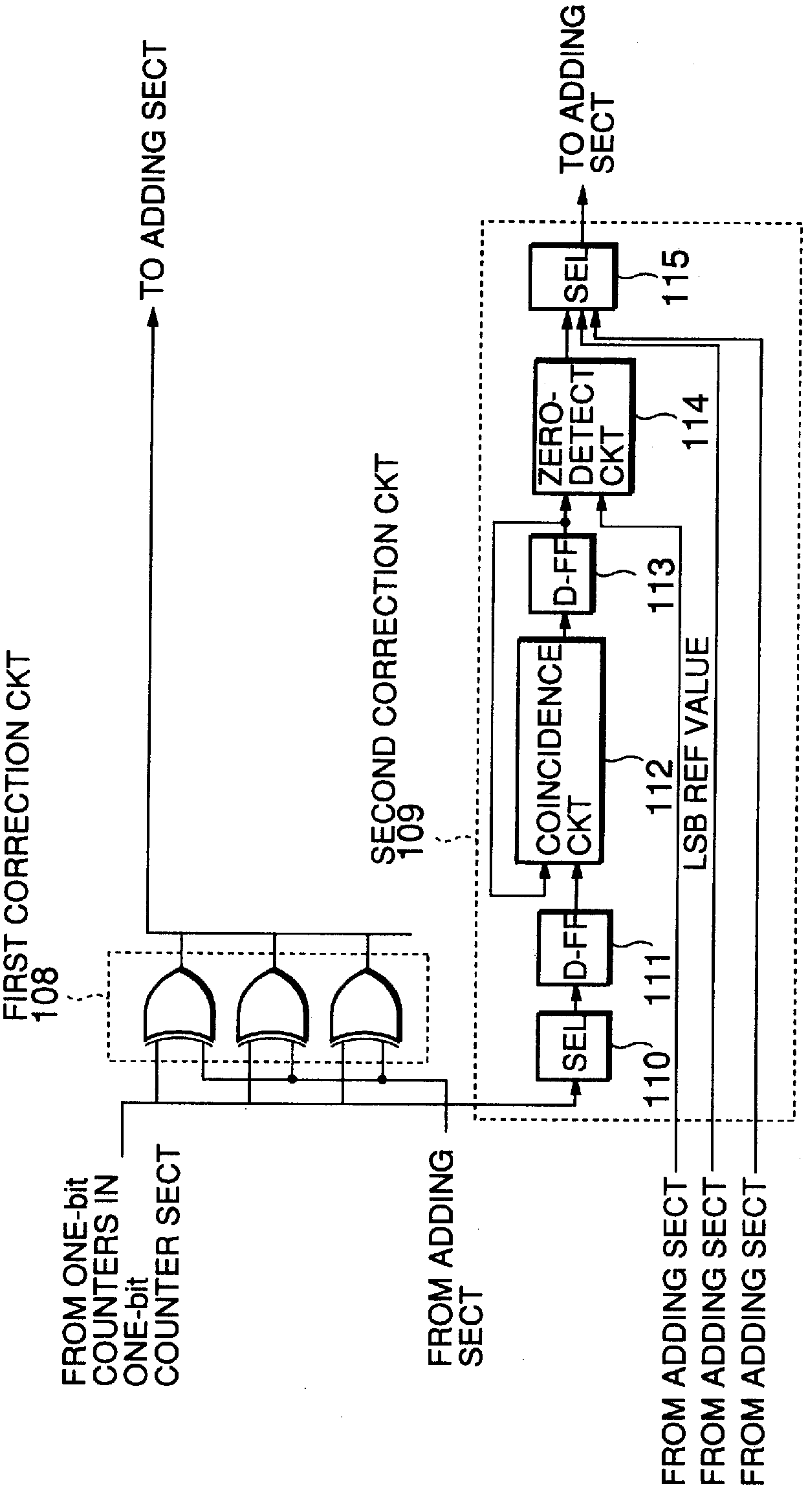
FIG.12 PRIOR ART
FIG. 12 is a circuit diagram of conventional first and second correction circuits.

Specifically, relative to n signals obtained through different stages of the delay buffers 105 in the high-frequency pulse generator 103, m-bit counters 10 ($m \geqq 4$) are provided in n stages (pipeline processing) for deriving an integral part of a mean counter value ($\Sigma/n$), and one-bit counters 11 are provided in n stages (pipeline processing) for deriving a decimal part of the mean counter value. Since each of the one-bit counters 11 lacks information about rise to unit from a first bit to a second bit, the first correction circuit 108 is provided as shown in FIG. 12 for carrying out +1 correction to one-bit counter values of 1 and 0 of the one-bit counters 11 and outputting information about rise to unit when the one-bit counter values of the one-bit counters 11 change from 1 to 0.

However, using the one-bit counters for obtaining the decimal parts causes an error in the time measurement accuracy. The reason for occurrence of the error is that since the pipelined one-bit counters are individual circuits, respectively, assuming that the resolution number for the system clock is n, it is possible that each of the n one-bit counters takes three kinds of counter values, that is, Q, Q+1 or Q+2. The counter value of the one-bit counter can only be 0 or 1. For eliminating the error in the time measurement accuracy, the second correction circuit 109 is provided as shown in FIG. 12.

The second correction circuit 109 comprises a selector 110 for selecting a plurality of necessary counter values from among the n pipelined one-bit counter values of the one-bit counters 11, a D-FF 111 for latching a signal from the selector 110, a coincidence circuit 112 for comparing an output from the D-FF 111 and a value obtained by incrementing an output of the D-FF 111 through the coincidence circuit 112 and a D-FF 113, the D-FF 113 for latching an output of the coincidence circuit 112, a zero-detection circuit 114 for carrying out zero detection based on an output value of the D-FF 113 and an output value from a selector 14 of an adding section 6 via the first correction circuit 108, and a selector 115 for selecting an output of the zero-detection circuit 114 and a counter value of a lower second bit of the m-bit counter 10 from the selector 14 of the adding section 6, using a control signal for switching an operation process of the adding section 6 between the m-bit side and the one-bit side. By inputting an output of the selector 115 into the adding section 6, an operation of the counter value of Q+2 is made possible.

Figure 13:
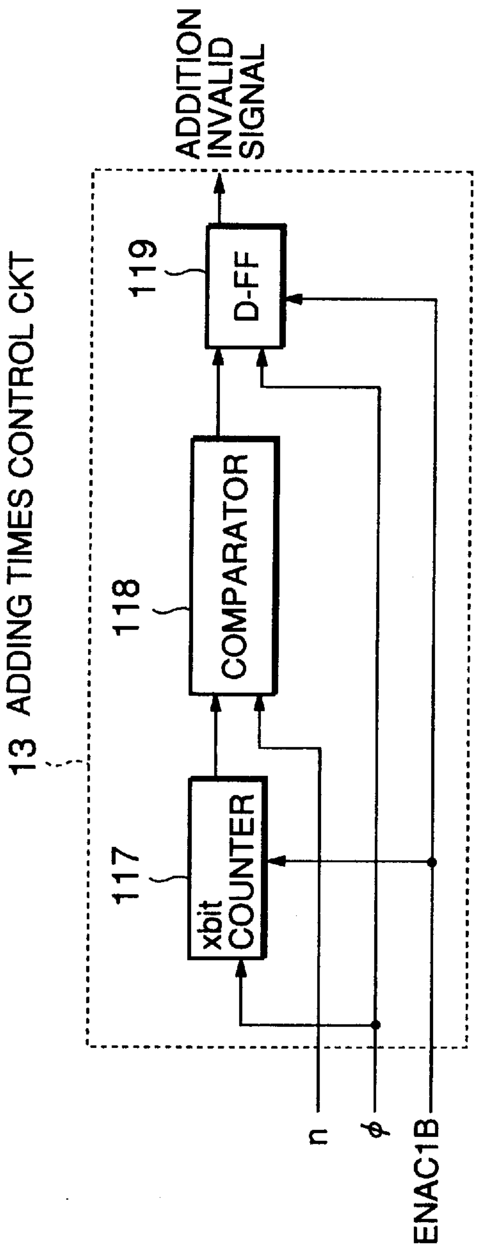
FIG.13 PRIOR ART
FIG. 13 is a circuit diagram of a conventional adding times control circuit.

Subsequently, selection is carried out to derive the sum total of the counter values of the m-bit counters 10 and the sum total of the counter values of the one-bit counters 11. A comparator 118 compares there solution number n derived at the MPU 20 and the number of addition times derived at an x-bit counter 117 of an operation times control circuit 116 as shown in FIG. 13. A comparison result from the comparator 118 is latched by a D-FF 119 so as to control the number of addition times of the one-bit counters 11.

The number of addition times of the counter values of the m-bit counters 10 is set in advance to be the number of the m-bit counters 10 to be used. The selector 14 selects an addition times control signal for the m-bit counters 10 or the one-bit counters 11 so as to control the number of addition times.

The counter values of the m-bit counters 10 or the one-bit counters 11 from the selector 14 are added through a D-FF 15, an ADD 16, a D-FF 17 and a D-FF 18 so as to derive the sum total of the counter values of the m-bit counters 10 or the one-bit counters 11. The derived sum total is stored in a register 19. The data stored in the register 19 are read and written into the MPU 20 at read/write timings of the MPU 20.

At the MPU 20, the sum total of the counter values of the m-bit counters 10 is divided by the number of m-bit counters 10 to be used. On the other hand, with respect to the counter values of the one-bit counters 11, the MPU 20 derives a resolution number n over a period of the clock ϕ based on the number n of one-bit counters 12 (LSB's of the m-bit counters 10 are used, and the one-bit counters 11 are used), and the number of continued counter values of low or high among counter values of the register 19 for controlling the read/write timings of the MPU 20 and the n one-bit counters 12, and controls the number of addition times at the adding section 6 up to n.

Each of the delay buffers 105 used in the high-frequency pulse generator 103 of FIG. 11 is subjected to dispersion in delay time depending on the conditions of source voltage and temperature, and thus the resolution number n varies accordingly. In view of this, the MPU 20 divides the sum total of the counter values of the m-bit counters 10 and the sum total of the counter values of the one-bit counters 11 by the resolution number n so as to derive the mean values thereof, respectively.

The dispersion of the counter values of the pipelined m-bit counters 10 and the dispersion of the counter values of the pipelined one-bit counters 11 during one period of the clock ϕ are not greater than +1 or +2, respectively. Accordingly, the counter value of the one-bit counter 11 becomes a counter value of the one-bit counter 11 when the stage number of the delay buffer in the high-frequency pulse generator 103 of FIG. 11 is the smallest, a +1 counter value or a +2 counter value. The counter value including an element below decimal point becomes a counter value of an LSB or a value of a lower second bit subjected to the +2 correction at the second correction circuit 109 in FIG. 12.

The mean value of the thus derived decimal parts is derived, the mean value of the integral parts is added to the mean value of the decimal parts to derive the sum of the mean values, and this sum is multiplied by a period of the clock ϕ to derive a measured time.

Figure 14:
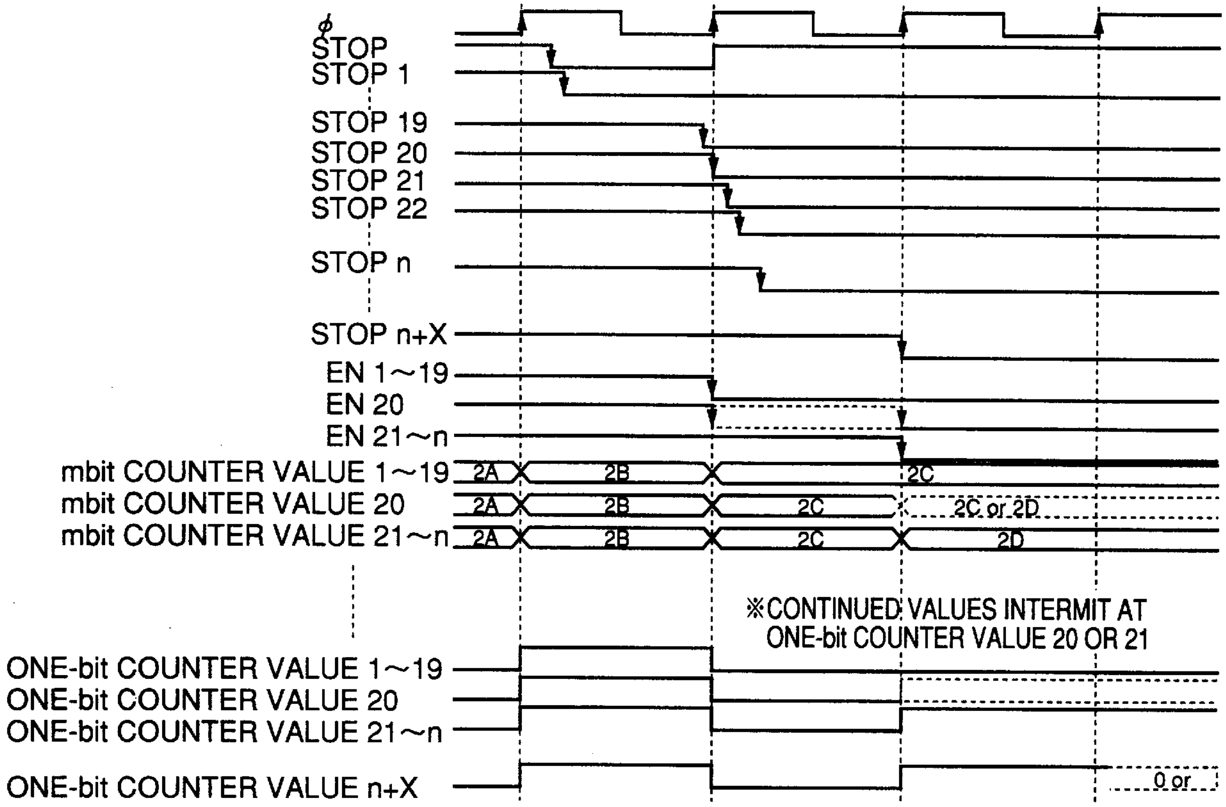
FIG.14 PRIOR ART
FIG. 14 is an operation chart of the time measuring system shown in FIG. 10.
Figure 16A:
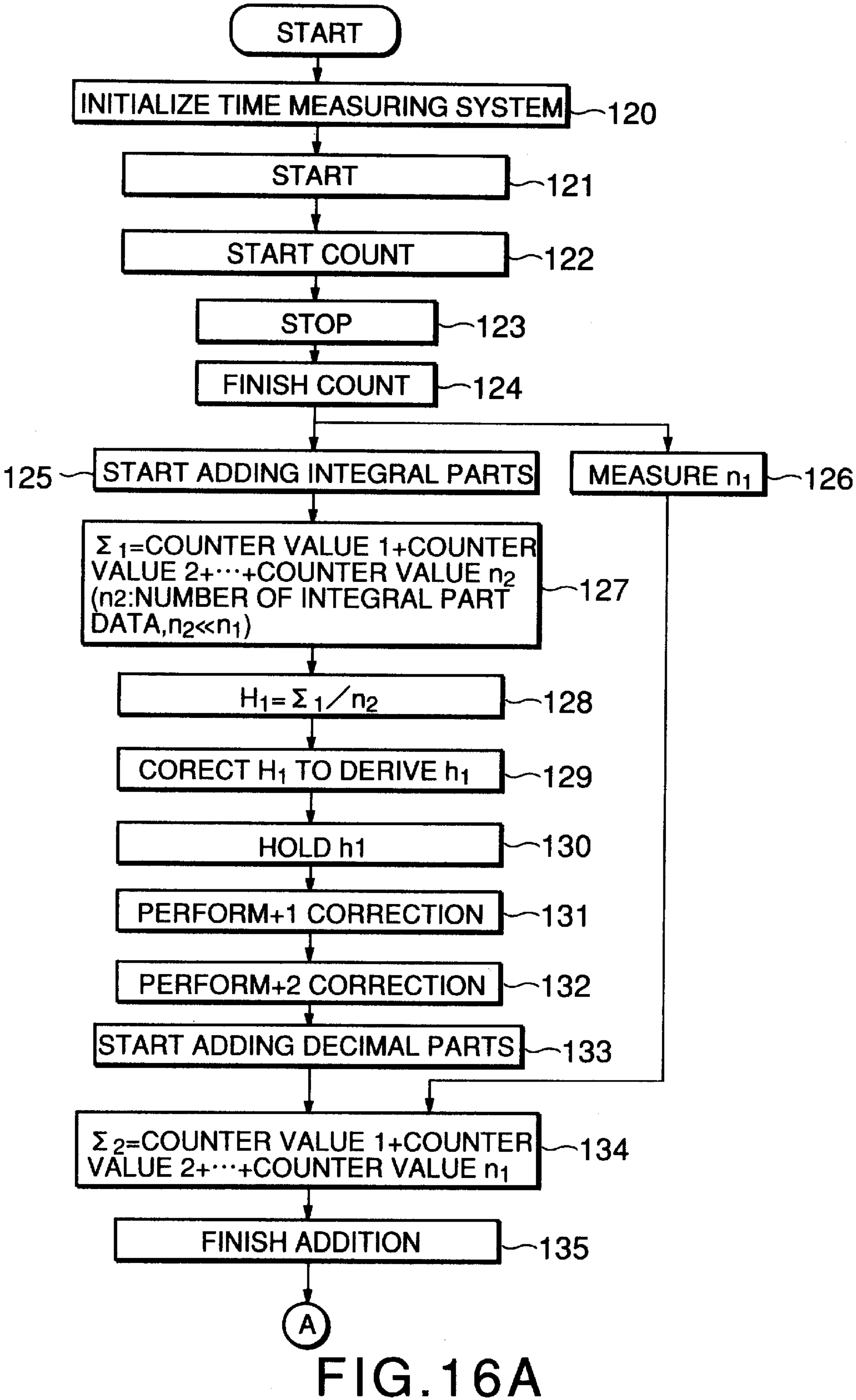
FIG.16A PRIOR ART
FIG. 16A is a flowchart showing an operation of the conventional time measuring system.
Figure 16B:
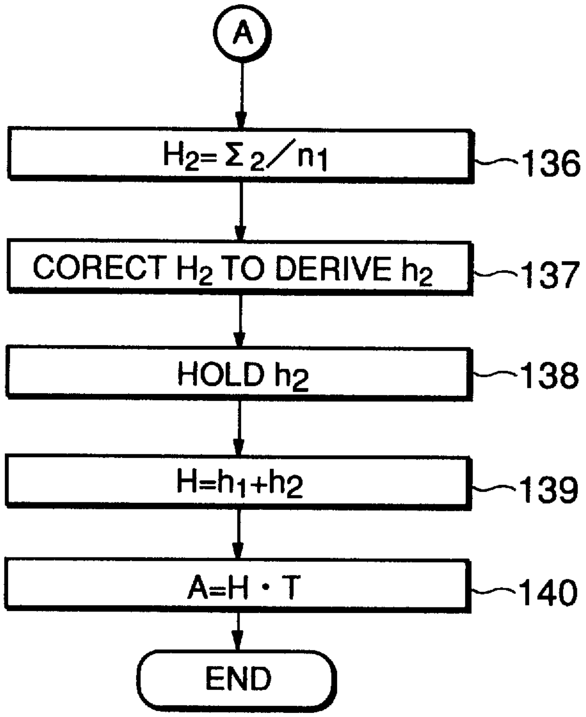
FIG.16B PRIOR ART
FIG. 16B is a flowchart showing an operation of the conventional time measuring system.

As shown in FIGS. 2 and 14, in response to an input of a signal to be measured, the high-frequency pulse generator 9 produces enable signals EN1 to n, which control the start and the stop of the counting of the m-bit counters 10, the one-bit counters 11 and the one-bit counters 12, based on a given start command and given stop commands STOP1 to STOPn. For n-resolving the system clock ϕ, the given stop commands STOP1 to STOPn have n delay times.

The enable signals EN1 to n produced by the given stop commands STOP1 to STOPn are divided into two kinds of values, that is, low and high levels, by the high-frequency pulse generator 9 to control the start and the stop of the counting of the m-bit counters 10, the one-bit counters 11 and the one-bit counters 12 so that the m-bit counter 10 takes two kinds of counter values, that is, Q or Q+1, the one-bit counter 11 takes three kinds of counter values, that is, Q, Q+1 or Q+2, and the one-bit counter 12 takes two kinds of counter values, that is, 0 or 1.

At the MPU 20, the sum total of the counter values Q and Q+1 of the m-bit counters 10 and the counter values of Q, Q+1 and Q+2 of the one-bit counters 11 is divided by the resolution number n derived by the number of the continued values of 0 or 1 among the counter values of the one-bit counters 12 so as to derive a mean counter value, and the derived mean counter value is multiplied by a period of the system clock, so that it is possible to carry out the measurement with accuracy of time shorter than the system clock.

As shown in FIGS. 42 and 15, since the one-bit counters 11 up to the resolution number n take three kinds of counter values of Q, Q+1 and Q+2, it is possible, by applying the +2 correction to one-bit counter values in FIG. 15 through the second correction circuit 109 in FIG. 12 and outputting them, to carry out the measurement with accuracy of time shorter than the system clock using the decimal part counters of one-bit structure.

As described above, the time measuring system is provided, in the conventional time measuring system, with the measurement reference value control section which produces the measurement reference value, the measurement start signal and the measurement stop signal using the inverse edges of the system clock whose dispersion in duty factor is eliminated through flip-flops and the like or a frequency double the system clock, and derives a difference between the measurement reference value and the measured time value measured by the time measuring system having the conventional structure so as to control whether the measurement is possible or not.

With this arrangement, it is possible to obtain the measurement result within the required measurement accuracy in the system which is capable of carrying out the measurement with accuracy of time shorter than the period univocally determined by the system operation speed. It is possible to give an alarm when the measurement result is not within the required measurement accuracy and carry out a feedback control of the measurement accuracy. When the system is used in a vehicle distance control system or the like, whether to perform an engine brake control or not can be determined using vehicle distances obtained by the measurement accuracy values and the time measurement values, so that the safety can be improved.

Reviewing FIGS. 1–5, 7, and 11–13, the time measuring system will be described by the use of other words in addition.

Referring to FIGS. 1 and 2, the high-speed counter section 1 counts up a counter value in response to a clock signal between supplies of a measurement start signal and a measurement stop signal to produce a counter output signal representative of the counter value. The adding section 2 executes an adding operation as regards the counter value by the use of the clock signal and the counter output signal to produce a sum total of the counter value. The data producing section 3 produces a resolution datum in response to the sum total by the use of the counter output signal. The signal producing section 4 produces the measurement start signal and the measurement stop signal by the use of the measurement able/disable switching signal, the original stop signal, the resolution datum, the sum total, and the clock signal to supply the measurement start signal and the measurement stop signal to the high-speed counter section 1. The sum total represents a measured time value.

Referring to FIG. 3, the comparing section 24 compares the measured time value with a reference time value by the use of the sum total and the resolution datum to judge whether a measurement accuracy necessary for the time measuring system is satisfied. The comparing section 24 produces a judgement result signal. The supply control means measurement signal generator 22 controls supply of the measurement start signal to the high-speed counter section 1.

Referring to FIG. 11, the delay buffers 105 have input terminals and output terminals which are connected in series. The shift registers 106 are connected to the output terminals of the delay buffers 105, respectively, each for producing a register output signal. The logic circuits 107 are connected to the shift registers 106, respectively, each for carrying out a logical operation of the register output signal.

Returning back to FIG. 2, the plural-bit counters 10 receive given outputs among outputs from the high-frequency pulse generator 9, respectively, so as to start or stop counting. The one-bit counter section 11 receives a plurality of outputs from the high-frequency pulse generator 9, respectively, so as to start or stop counting. The first correction circuit based on an operation result from the adding section carries out +1 correction relative to a plurality of one-bit counter values of the one-bit counters. The second correction circuit which, based on the plurality of one-bit counter values and data selected at the adding section 2, carries out +2 correction relative to a plurality of one-bit counter values. The additional one-bit counter section 12 receives a plurality of outputs from the high-frequency pulse generator so as to start or stop counting. The selector 14 receives one-bit counter values and plural-bit counter values from the high-speed counter section 1 to produce a selector output. The first latch 15 receives the selector output to hold a datum carried by the selector output. The adder 16 receives the data that is held at the first latch 15. The adder 16 produces an adder output representative of the datum. The second latch 17 feeds its output to the adder 16. The third latch 18 receives the adder output.

Referring to FIG. 3, the reference value setting section 23 sets a reference time value. The comparing section 24 compares the reference time value with the sum total to produce a comparison result signal. The measurement signal generator 22 generates the measurement start signal and the measurement stop signal with reference to the comparison result signal and the reference time value.

Referring to FIG. 4, the latch 26 latches the measurement able/disable switching signal by the use of the clock signal to produce the measurement start signal. The selector 27 receives the measurement stop signal and a signal produced at the reference value setting section 23 to produce the measurement stop signal.

Referring to FIG. 5, the Wbit counter 29 receives the measurement start signal to start counting. The first latch 30 produces a given value when the counter value of the Wbit counter 29 reaches the given value. The second latch 31 receives a datum representative of the given value. The third latch 32 latches the datum at timings shorter than a period univocally determined by an operation speed of the time measuring system and for supplying the datum to the measurement signal generator 22. The reference value generator 33 produces the reference time value in response to the counter value of the Wbit counter 29 and to latch timings of the first, second and third latches 31 and 32.

Referring to FIG. 7, the integral part comparator 35 compares an integral part of the reference time value with the sum total to produce an integral part comparison result. The decimal part comparator 36 compares a decimal part of the reference time value with the sum total by the use of the resolution datum to produce a decimal part comparison result. The first latch 38 latches, by the use of the clock signal, a selected datum obtained through a logical operation between the integral part comparison result and the decimal par comparison result. The second latch 39 latches an output signal of the first latch. The timing adjuster 37 adjusts a timing of the counter output signal to produce an adjuster output. The third latch 40 latches, by the use of the clock signal, a result of a logical operation among the selected datum, the adjuster output, and the reference timing value. The counter 41 counts the number of times of the measurement accuracy selection by the use of an output of the third latch 40.

What is claimed is:

1. A time measuring system comprising:

a high-speed counter section for counting up a counter value in response to a clock signal between supplies of a measurement start signal and a measurement stop signal to produce a counter output signal representative of said counter value;

an adding section connected to said high-speed counter section for executing an adding operation as regards said counter value by the use of said clock signal and said counter output signal to produce a sum total of said counter value;

a data producing section connected to said adding section and said high-speed counter section for producing a resolution datum in response to said sum total by the use of said counter output signal; and a signal producing section connected to said data producing section, said adding section, and said high-speed counter section and supplied with a measurement able/disable switching signal and with an original stop signal for producing said measurement start signal and said measurement stop signal by the use of said measurement able/disable switching signal, said original stop signal, said resolution datum, said sum total, and said clock signal to supply said measurement start signal and said measurement stop signal to said high-speed counter.

2. A time measuring system as claimed in claim 1, wherein said sum total represents a measured time value, said signal producing section comprising:

comparing means connected to said adding section and said data producing section for comparing said measured time value with a reference time value by the use of said sum total and said resolution datum to judge whether a measurement accuracy necessary for the time measuring system is satisfied, said comparing means producing a judgement result signal; and supply control means connected to said comparing means and responsive to said judgement result signal for controlling supply of said measurement start signal to said high-speed counter section.

3. A time measuring system as claimed in claim 1, wherein said sum total represents a measured time value, said signal producing section comprising:

comparing means connected to said adding section and said data producing section for comparing said measured time value with a reference time value by the use of said sum total and said resolution datum to judge whether a measurement accuracy necessary for the time measuring system is satisfied, said comparing means producing a judgement result signal; and system control means connected to said comparing means and responsive to said judgement result signal for controlling operation of said time measuring system.

4. A time measuring system as claimed in claim 3, wherein said signal producing section further comprises alarm means connected to said comparing means and responsive to said judgement result signal for generating an alarm.

5. A time measuring system as claimed in claim 1, wherein said high-speed counter section has a high-frequency pulse generator comprising:

a plurality of delay buffers having input terminals and output terminals which are connected in series;

a plurality of shift registers connected to said output terminals of the delay buffers, respectively, each for producing a register output signal; and a plurality of logic circuits connected to said shift registers, respectively, each for carrying out a logical operation of said register output signal.

6. A time measuring system as claimed in claim 5, wherein said high-speed counter section further has a plurality of plural-bit counters which receive given outputs among outputs from said high-frequency pulse generator, respectively, so as to start or stop counting.

7. A time measuring system as claimed in claim 5, wherein said high-speed counter section has a one-bit counter section comprising:

a plurality of one-bit counters for receiving a plurality of outputs from said high-frequency pulse generator, respectively, so as to start or stop counting;

a first correction circuit based on an operation result from said adding section for carrying out +1 correction relative to a plurality of one-bit counter values of said one-bit counters; and a second correction circuit which, based on said plurality of one-bit counter values and data selected at said adding section, carries out +2 correction relative to a plurality of one-bit counter values.

8. A time measuring system as claimed in claim 7, wherein said high-speed counter section further has an additional one-bit counter section for receiving a plurality of outputs from said high-frequency pulse generator so as to start or stop counting.

9. A time measuring system as claimed in claim 1, wherein said adding section comprises:

a selector connected to said high-speed counter section for receiving one-bit counter values and plural-bit counter values from said high-speed counter section to produce a selector output;

a first latch connected to said selector for receiving said selector output to hold a datum carried by said selector output;

an adder connected to said first latch for receiving said data that is held at said first latch, said adder producing an adder output representative of said datum;

a second latch connected to said adder for receiving said adder output and feeding its output to said adder; and a third latch connected to said second latch for receiving said adder output.

10. A time measuring system as claimed in claim 1, wherein said signal producing section comprises:

a reference value setting section for setting a reference time value;

a comparing section connected to said adding section for comparing said reference time value with said sum total to produce a comparison result signal; and a measurement signal generator connected to said comparing section, said reference value setting section, and said high-speed counter section and supplied with said measurement able/disable switching signal and with said original stop signal for generating said measurement start signal and said measurement stop signal with reference to said comparison result signal and said reference time value.

11. A time measuring system as claimed in claim 10, wherein said measurement signal generator comprises:

a latch connected to said high-speed counter section for latching said measurement able/disable switching signal by the use of the clock signal to produce said measurement start signal; and a selector connected to said latch and said high-speed counter section for receiving said measurement stop signal and a signal produced at said reference value setting section to produce said measurement stop signal.

12. A time measuring system as claimed in claim 10, wherein said reference value setting section comprises:

a Wbit counter connected to said measurement signal generator for receiving said measurement start signal to start counting;

a first latch connected to said Wbit counter for producing a given value when the counter value of said Wbit counter reaches said given value;

a second latch connected to said first latch for receiving a datum representative of said given value;

a third latch connected to said second latch and said measurement signal generator for latching said datum at timings shorter than a period univocally determined by an operation speed of said time measuring system and for supplying said datum to said measurement signal generator; and a reference value generator connected to said Wbit counter and said comparing section for producing said reference time value in response to the counter value of said Wbit counter and to latch timings of said first, second and third latches.

13. A time measuring system as claimed in claim 10, wherein said comparing section comprising:

an integral part comparator connected to said reference value setting section and said adding section for comparing an integral part of said reference time value with said sum total to produce an integral part comparison result;

a decimal part comparator connected to said reference value setting section, said adding section, and said data producing section for comparing a decimal part of said reference time value with said sum total by the use of said resolution datum to produce a decimal part comparison result;

a first latch connected to said integral part comparator and decimal part comparator for latching, by the use of said clock signal, a selected datum obtained through a logical operation between said integral part comparison result and said decimal par comparison result;

a second latch connected to said first latch for latching an output signal of said first latch;

a timing adjuster connected to said high-speed counter for adjusting a timing of said counter output signal to produce an adjuster output;

a third latch connected to said timing adjuster, said integral part comparator, said decimal part comparator, and said reference value setting section for latching, by the use of the clock signal, a result of a logical operation among said selected datum, said adjuster output, and said reference timing value; and a counter connected to said third latch for counting the number of times of the measurement accuracy selection by the use of an output of said third latch.

14. A time measuring method by the use of a time measuring system, comprising:

a first step of initializing said time measuring system;

a second step of starting a mode of measuring a resolution number based on measurement of an actual value relative to the measurement reference value;

a third step of setting the measurement reference value and producing a measurement object signal corresponding to the measurement reference value;

a fourth step of, upon receipt of the measurement object signal from the third step, starting count in response to a given start command;

a fifth step of stopping the count in response to a given stop command;

a sixth step of, after the stop of the count at the fifth step, start addition of counter values at given integral parts;

a seventh step of deriving the sum total of the integral part counter values through a given number of times of the addition and stopping the addition;

an eighth step of, after the stop of the addition at the seventh step, dividing the sum total of the integral part counter values by the given number of times of the addition to derive a first mean value;

a ninth step of correcting the first mean value to derive a first corrected mean value;

a tenth step of holding the first corrected mean value;

an eleventh step of, after the stop of the count at the fifth step, performing +1 correction, based on discrimination of rise to unit of counter values of decimal parts, relative to those decimal part counter values;

a twelfth step of, based on discrimination of continued equal counter values of the decimal parts, performing +2 correction to those decimal part counter values;

a thirteenth step of starting addition of the decimal parts;

a fourteenth step of, after the stop of the counting at the fifth step, measuring the resolution number;

a fifteenth step of holding the measured resolution number;

a sixteenth step of, after the holding of the resolution number at the fifteenth step, adding the corresponding counter values by a given number of times corresponding to the resolution number so as to derive the sum total of the counter values of the decimal parts;

a seventeenth step of stopping the addition of the decimal parts;

an eighteenth step of, after the stop of the addition at the seventeenth step, dividing the sum total of the decimal part counter values by the resolution number to derive a second mean value;

a nineteenth step of correcting the second mean value to derive a second corrected mean value;

a twentieth step of holding the second corrected mean value;

a twenty-first step of adding the first corrected mean value held at the tenth step and the second corrected mean value held at the twentieth step to derive a third mean value;

a twenty-second step of comparing the measurement reference value set at the third step and the third mean value derived at the twenty-first step to determine whether a difference between the measurement reference value and the third mean value is in a given measurement accuracy range;

a twenty-third step of, if answer at the twenty-second step is negative, counting the number of times of the comparison at the twenty-second step to determine whether the number of times of the comparison at the twenty-second step has reached a given number of times;

a twenty-fourth step of, if answer at the twenty-third step is positive, stopping the system;

a twenty-fifth step of, if answer at the twenty-second step is positive, initializing a counter section;

a twenty-sixth step of starting a mode of measuring an actual value in response to an input of a signal to be measured;

a twenty-seventh step of starting count in response to a given start command;

a twenty-eighth step of stopping the count in response to a given stop command;

a twenty-ninth step of, after the stop of the count at the twenty-eighth step, starting addition of counter values at given integral parts;

a thirtieth step of deriving the sum total of the integral part counter values through the given number of times of the addition and stopping the addition;

a thirty-first step of, after the stop of the addition at the thirtieth step, dividing the sum total of the integral part counter values by the given number of times of the addition to derive a fourth mean value;

a thirty-second step of correcting the fourth mean value to derive a third corrected mean value;

a thirty-third step of holding the third corrected mean value;

a thirty-fourth step of, after the stop of the count at the twenty-eighth step, performing +1 correction, based on discrimination of rise to unit of counter values of decimal parts, relative to those decimal part counter values;

a thirty-fifth step of, based on discrimination of continued equal counter values of the decimal parts, performing +2 correction to those decimal part counter values;

a thirty-sixth step of starting addition of the decimal parts;

a thirty-seventh step of adding the counter values corresponding to the resolution number held at the fifteenth step by the given number of times corresponding to the resolution number so as to derive the sum total of the counter values of the decimal parts;

a thirty-eighth step of stopping the addition of the decimal parts;

a thirty-ninth step of, after the stop of the addition at the thirty-eighth step, dividing the sum total of the decimal part counter values by the resolution number to derive a fifth mean value;

a fortieth step of correcting the fifth mean value to derive a fourth corrected mean value;

a forty-first step of holding the fourth corrected mean value;

a forty-second step of adding the third corrected mean value held at the thirty-third step and the fourth corrected mean value held at the forty-first step to derive a sixth mean value; and a forty-third step of deriving a measured time by multiplication between the sixth mean value and a period of a system clock pulse.

* * * * *